United States Patent [19]

Fennel et al.

[11] Patent Number: 4,746,173
[45] Date of Patent: May 24, 1988

[54] SLIP-CONTROLLED BRAKE SYSTEM FOR ALL-WHEEL DRIVEN AUTOMOTIVE VEHICLE

[75] Inventors: Helmut Fennel, Bad Soden; Hans Wupper, Friedrichsdorf; Gunther Buschmann, Griesheim; Norber Ehmer, Bad Soden, all of Fed. Rep. of Germany

[73] Assignee: Alfred Teves GmbH, Frankfurt am Main, Fed. Rep. of Germany

[21] Appl. No.: 914,341

[22] Filed: Oct. 2, 1986

[30] Foreign Application Priority Data

Oct. 2, 1985 [DE] Fed. Rep. of Germany ....... 3535090

[51] Int. Cl.⁴ ............................ B60T 8/26; B60T 8/32
[52] U.S. Cl. ..................................... 303/100; 180/244; 180/245; 180/248; 188/181 R; 303/114; 303/119; 303/96
[58] Field of Search ............................ 303/100, 91-93, 303/103, 61, 110, 111, 6 R, 113-119, DIGS. 1-4, 94-109, 112; 74/710.5; 180/197, 246, 244, 247, 248, 249, 245; 188/181 A, 181 R, 181 T

[56] References Cited

U.S. PATENT DOCUMENTS

| | | | |
|---|---|---|---|
| 3,463,555 | 8/1969 | Ryskamp | 303/6 R X |
| 3,519,314 | 7/1970 | Ballard | 303/6 R X |
| 4,361,871 | 11/1982 | Miller et al. | 303/92 X |
| 4,538,700 | 9/1985 | Suzuki | 303/100 X |
| 4,552,241 | 11/1985 | Suzuki | 180/197 X |
| 4,585,280 | 4/1986 | Leiber | 303/DIG. 4 X |
| 4,589,511 | 5/1986 | Leiber | 180/244 X |

FOREIGN PATENT DOCUMENTS

| | | |
|---|---|---|
| 1941073 | 4/1970 | Fed. Rep. of Germany. |
| 1914765 | 10/1970 | Fed. Rep. of Germany. |
| 3418520 | 11/1985 | Fed. Rep. of Germany. |
| 3426747 | 1/1986 | Fed. Rep. of Germany. |

OTHER PUBLICATIONS

DE-Z, Bosch: Technische Berichte, Antiblockierregel Systeme, 1980.
DE-Z, ATZ 9, 1985, S. 395.

*Primary Examiner*—Douglas C. Butler
*Attorney, Agent, or Firm*—James B. Raden; Robert P. Seitter

[57] ABSTRACT

A slip-controlled hydraulic brake system for all-wheel driven motor vehicles equipped with lockable differentials (2, 3) is provided with sensors ($S_1$–$S_4$, 33–36) for measuring the rotational behavior of the wheels. Electronic circuits (44) are provided for logic combining and processing the sensor signals, and for generating braking pressure control signals by way of which the brake pressure in the individual wheel brakes (16–19) is variable in response to the rotational behavior of the wheels and to a reference variable. To compensate the increased moments of inertia as a result of the moments transmission, by way of the lockable differentials (2, 3) in this brake system the brake pressure in the rear-wheel brakes (18, 19), can be modulated at a lower control frequency as compared with the brake pressure in the front-wheel brakes (16, 17). The reduction in the control frequency of the rear-wheel brake pressure is determined by driving-dynamic criteria, for example, by the average motor vehicle deceleration or by the motor vehicle speed.

3 Claims, 2 Drawing Sheets

SLIP-CONTROLLED BRAKE SYSTEM FOR ALL-WHEEL DRIVEN AUTOMOTIVE VEHICLE

BACKGROUND OF THE INVENTION

The present invention relates to a slip-controlled hydraulic brake system for all-wheel driven motor vehicles equipped with lockable differentials. The system comprises a variety of sensors for measuring the rotational behavior of the wheels, and electronic circuits for logic combining and processing the sensor signals and for generating brake pressure control signals by way of which the brake pressure in the individual wheel brakes is variable in response to the rotational behavior of the wheels and to a vehicle speed reference variable.

In motor vehicles with all-wheel drive and slip-controlled brake systems, the transmission of drive and brake torques, by way of the drive shafts, and the elevated moments of inertia, envolves difficulties in measuring and interpreting the rotational behavior of the wheels and the regulation or modulation of the brake pressure derived therefrom. By differential locks, the transmission of the brake torques from one wheel to the other wheel is further increased, thereby adding to the difficulties of the brake slip control. To overcome these difficulties, it is basically conventional practice to deactivate the slip control when engaging the differential locks. However, this envolves the disadvantage that in the event of unfavorable road or wheather conditions in which differential locks are required, one must forego the slip control, although the slip control under these conditions could accentuate its advantages and preserve the steerability and the driving stability of the motor vehicle.

According to another suggestion for overcoming this problem, the differential locks are automatically released upon commencement of the brake slip control (German Patent Application P No. 3418520.8 printed and published Nov. 21, 1985. However, this will require switchable differential locks, for which reason this solution is unsuitable, for example, for motor vehicles containing viscose couplings as differential locks.

Moreover, it has already been suggested to mount, in at least one of the split axles transferring the driving torque from a differential to a wheel, a disconnecting clutch automatically disengageable by the brake slip control signal (German Patent Application P No. 3426747.6) printed and published Jan. 30, 1986. However, such additional mechanical efforts are not always acceptable.

It is, therefore, the object of the present invention to overcome these shortcomings of these brake systems and to develop a brake system suitable for all-wheel driven motor vehicles which also permits a brake slip control with locked rear axle and/or distibution differentials, thereby safeguarding in any situation the steerability and the driving stability of the motor vehicle by preserving a short stopping distance.

SUMMARY OF THE INVENTION

It has now been found that this problem is solved in simple and technically progressive manner by a brake system of the type described, the special feature of which resides in that the brake pressure in the rear wheel brakes, as compared with the brake pressure in the front wheel brakes, can be modulated at a lower control frequency.

In the practice of the invention, hence, the brake pressure on the front-axle and on the rear-axle is controlled, at least in predetermined situations, at different speeds. While the electronic control adapts the brake pressure in the front wheel brakes which, in the majority of cases, make a substantially higher contribution to deceleration, at an optimum speed, to the rotational behavior of the wheels and to the wheel deceleration, the more extended times of response to the brake pressure variations on the rear-axle are accounted for by the lower control frequency of the rear wheel brake pressure. Owing to the connection of the rear wheels to one another by way of the rear-axle differential and to the front-axle the distribution differential, an apparent increase in the moments of inertia through transmission of the brake torques exerted upon the front wheels occurs. In addition, an actual increase in the moments of inertia through the rotational masses of the additional driving shafts and differential wheels occurs. Due to the increased moments of inertia and the times of response caused thereby, in conventional brake systems, the pressure is built up for an excessively long period of time. The same applied to the pressure decrease thereby causing relatively high pressure fluctuation amplitudes resulting in great slip phases and in the excitation of undercarriage vibrations. The great amount of slip on the rear wheels, has an equally extreme adverse effect on the driving stability. The afore-described disadvantages have been overcome by the configuration of the brake system and the appertaining circuits, respectively, as provided by the invention.

According to an expedient embodiment of this invention, the control frequency of the brake pressure in the rear wheel brakes (as compared with the control frequency of the front wheel brake pressure) can be reduced in response to driving dynamic criteria, especially to the medium deceleration of the motor vehicle and/or the speed of the vehicle, with the medium deceleration of the vehicle being derivable from the sensor signals, for example, from the vehicle speed reference quality under consideration of predetermined criteria, and by logic combining the measured data. Conversely, also a deceleration data receiver can be provided in the brake system for determining the deceleration of the motor vehicle.

According to another embodiment of the brake system of the present invention, the brake pressure pattern in the front wheel brakes is individually controllable, and in the rear wheel brakes, is jointly controllable according to the "select-low" criterion.

Moreover, according to one form of embodiment, it is provided to vary the brake pressure by the pulse-wise energization of electromagnetically operable brake pressure increasing and decreasing valves and to reduce the control frequency of the rear wheel brakes by extending the pulse sequences or by extending the intervals between the pressure increasing or pressure decreasing pulses, respectively. A reduction of the individual valve energizing pulses brings about an identical or similar result.

In addition, one form of embodiment of the invention resides in that the brake force portion of the rear wheels can be decreased (in favor of an enhanced driving and side stability) by reducing the control frequency.

A brake system of the type developed by the invention is particularly suitable for motor vehicles having viscose couplings for locking the rear-axle and/or the distribution differentials.

BRIEF DESCRIPTION OF THE DRAWING

Various other objects, features and attendant advantages of the invention will be more fully understood from the following description when taken in conjunction with the accompanying wherein.

DETAILED DESCRIPTION

Figure 1:
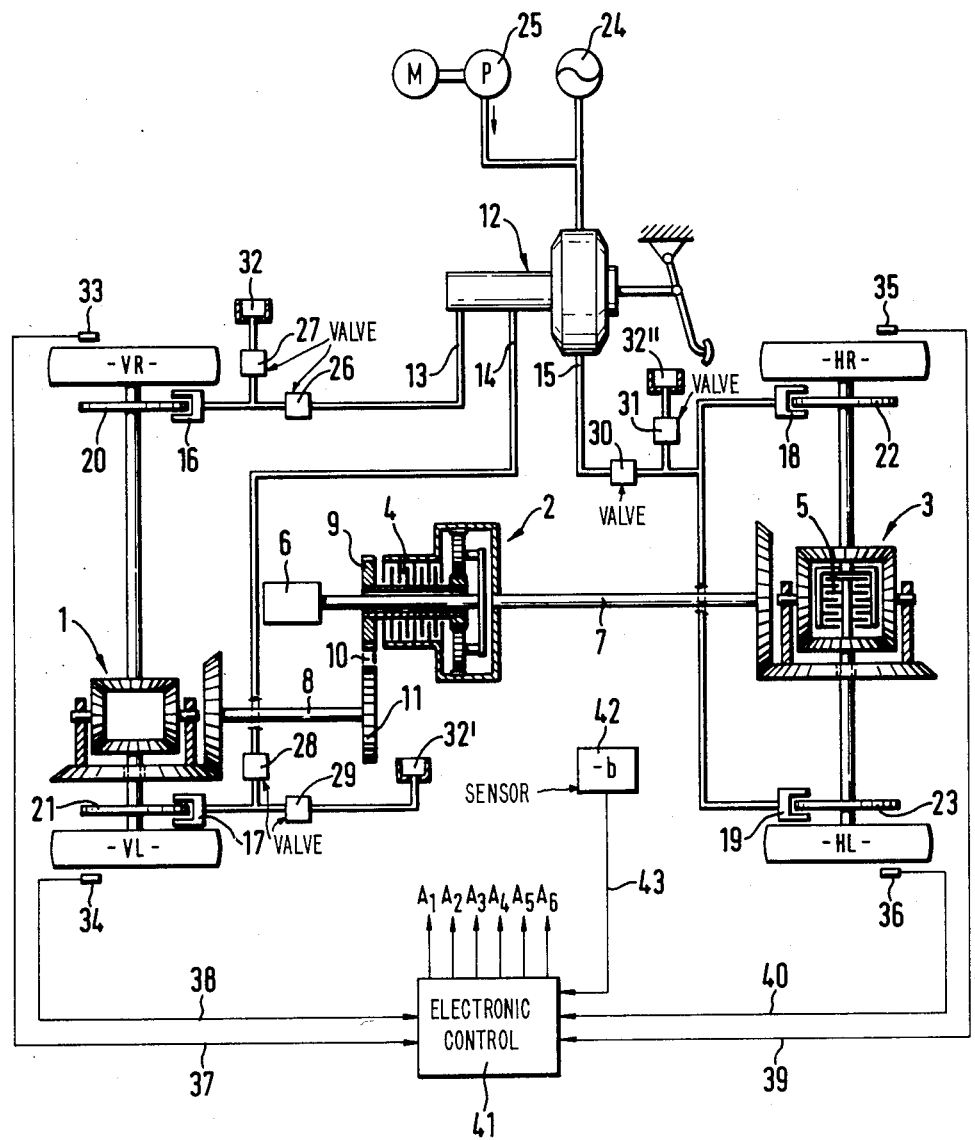
FIG. 1 is a schematical illustration of the driving track and of the differentials of an all-wheel driven motor vehicle, and of the differentials of an all-wheel driving motor vehicle, and of the essential components of a hydraulic brake system comprising an electronic slip control; and, FIG. 2 is the block diagram of the basic construction of the circuits for controlling a brake system in accordance with the present invention.

The all-wheel driven motor vehicle according to FIG. 1, is equipped with three differentials, by way of a front-wheel differential 1, an intermediate or distribution differential 2, and a rear-axle differential 3. Provided in the distribution differential 2 and in the rear-axle differential 3 are visco-couplings 4, 5 serving as differential locks. The couplings include meshing vanes which, by way of a high-viscous fluid, are in engagement with one another. The so called visco-couplings 4, 5, therefore, automatically build up a speed-responsive locking torque growing with an increasing speed difference.

Referring to FIG. 1, the driving motor of the automotive vehicle as shown, inclusive of a switch gear, is designated by reference numeral 6. By way of distribution differential 2 which, in the present instance, is configured as a planetary gear, on the one hand, the driving power through a driving shaft 7 is led to the rear-axle differential 3 and, on the other hand, through a shaft 8, is led to the front-wheel differential 1. For this purpose, a toothed gear 9 of the planetary gear (2) with the aid of a sprocket 10 is connected to a toothed gear 11 secured to the shaft 8. In FIG. 1, the front wheels are designated by VR, VL, while the rear wheels are designated by HR, HL.

The brake system of the automotive vehicle as shown comprised a hydraulic brake pressure generator 12 to which are connected, by way of three hydraulically separate pressure fluid circuits 13, 14, 15, wheel brakes 16 to 19. Upon applying the brake, disc brakes 16 to 19 engage the appertaining brakes discs 20 to 23. A hydraulic tank 24 and a pressure fluid pump 25 actuated by electromotive force are provided for supplying the hydraulic brake pressure generator 12 with auxiliary energy.

Pairs of valves 26, 27; 28, 29 and 30, 31 are inserted into the pressure fluid conduits 13, 14, 15 leading from the brake pressure generator 12 to the wheel brakes 16 to 19; the pairs of valves are electrically or electromagnetically operable and suitable to keep the brake pressure, during the controlled braking operation, constant, decrease or re-increase the same. Valves 26, 28 and 30 provided in the pressure fluid conduit leading from the brake pressure generator 12 to the wheel brakes 16 to 19, serve as inlet valves, whereas, after reswitch, pressure fluid can flow back to a pressure compensating tank 32 and 32' or 32", respectively, by way of so-called outlet valves 27, 29 and 31 normally closed. In this manner, the brake pressure is decreased for the slip control.

The compensating tanks 32, 32' and 32", actually, are of an integral construction and are in communication with the intake side of the hydraulic pump 25 so that the pressure fluid, that is, the brake fluid, discharged for the pressure decrease, can be returned to the brake pressure generator 12 and to the brake circuits.

In the brake system as presently shown, the brake pressure in the front wheel brakes 16, 17, by way of valve pairs 26, 27 and 28, 29, respectively, can be controlled individually whereas for the two rear wheels HR, HL and for the rear wheel brakes 18, 19, respectively, only one common pair of brake pressure control valves 30, 31 is available. The brake pressure in the rear wheel brakes 18, 19, in this instance, is dependent on the rear wheel having the poorer road contact, with the so-called "select-low"-criterion applying.

The rotational behavior of the individual wheels is permanently measured by wheel sensors 33 to 36 feeding their information, by way of signal conduits 37 to 40, into an electronic control 41. Control 41 contains electronic circuits editing, logically combining and processing the measuring signals and generating the brake pressure control signals which, after amplification, by way of outlets $A_1$ to $A_6$ and by way of signal conduits (not shown) are returned to the individual valves 26 to 31 and by way of which the brake pressure pattern virtually is controlled upon commencement of the brake slip control.

In the example of embodiment as shown, the automotive vehicle, in addition, is equipped with a vehicle decelerating sensor 42 the output signal of which, by way of an electrical conduit 43, is equally fed to control 41 and is taken into accunt in determining the brake pressure control signals, i.e. the signals available at the outlets $A_1$ to $A_6$.

Figure 2:
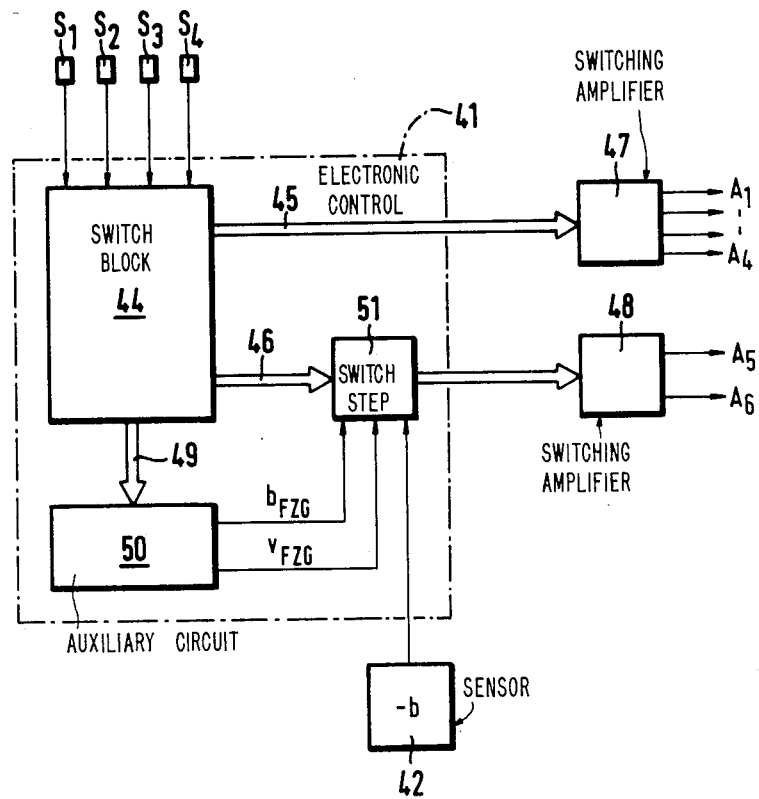

The manner of operation of the electronic circuits in the interior of the control 41 is illustrated by FIG. 2. These can be hardware-implemented logic circuits or program-controlled circuits, such as micro-computers, or both.

The electronic circuits and the logic circuits for deriving and generating the brake pressure control signals of a conventional slip control and symbolized by switch block 44. With the aid of sensors $S_1$ to$_4$ corresponding to wheel sensors 33 to 36 of FIG. 1, the measuring data and information, respectively, on the rotational behavior of the individual wheels of the motor vehicle, are fed into switch block 44. By way of multidirectional conduits 45 and 46, energizing signals as a result of the signal processing and logic combination in switch block 44, are fed to switching amplifiers 47, 48 at the outlets $A_1$ to $A_6$ of which the signals for controlling the brake pressure control valves, such as the pairs of valves 26, 27; 28, 29 and 31, 31 shown in FIG. 1, are available.

However, in order to overcome the difficulties caused by the all-wheel drive and the differential locks or visco-couplings, respectively, in the practice of the present invention, the brake pressure in the rear wheel brakes 18, 19, as compared with the brake pressure in the front wheel brakes 16, 17, is modulated at a different control frequency. For this structural arrangement switch block 44, is in communication with an auxiliary circuit 50 by way of signal conduits 49 with which under consideration of the average vehicle deceleration $b_{FZG}$ and the vehicle speed $v_{FZG}$, by way of a switch step 51, the pressure modulation in the wheel brakes of the rear axle is extended.

The outlets of booster 47 lead to the valve pairs 26, 27 and 28, 29 of the front axle, while the outlets $A_5$ and $A_6$ of the switch booster 48 lead to the valve pair 30, 31 of the rear axle.

Moreover, in the embodiment described, in the modification of the pressure pattern of the rear-axle, with the aid of circuit 51, the actual vehicle deceleration -b is taken into account, which is measured by means of a special deceleration metering device (in the present instance by a mercury deceleration sensor 42).

When applying the brake pedal excessively, as, for example, in panic deceleration or on a slippery road, first one or both front wheels will become instable. In the practice of the invention, thereupon the brake pressure in the front wheel brakes 16, 17, is modulated in accordance with the rotational behavior of the wheels. Due to the connection of the front-and rear-axles through the visco-coupling 4, and the interconnection of the rear-wheels through the visco-coupling 5, the brake torque and the pressure changes are transmitted to the rear wheels. The times of response to pressure variations, in an all-wheel driven automotive vehicle of this type equipped with lockable differentials, on account of the coupled masses, are relatively extended. An increase in the moments of inertia apparently occurs through the transmission torques and, moreover, a factual increase in the moments of inertia owing to the masses rotating at the same time. The increased moments of inertia envolve the risk of an excessively extended pressure build-up whereupon, subsequently, a high pressure difference will have to be compensated. In view of the moments of inertia, the pressure decrease, in turn, is excessively extended thereby causing vibrations of the undercarriage and favoring phases of great slip amounts. The coupling effect bears the additional risk that through synchronism of the wheel speeds, the vehicle reference speed, temporarily, is in error because the electronics, owing to the substantial synchronism of the wheels, no longer is able to identify the actual speed of the motor vehicle, deceleration or acceleration.

In the practice of the present invention, and to preserve an effective deceleration, the brake pressure at the front-axle is mounted with un unreduced speed, whereas the brake pressure variation at the rear-axle will be extended and decelerated, respectively. This can be easily attained by increasing the intervals between the individual pressure increasing and pressure decreasing pulses. A reduction in the pulse widths and a preservation of the pulse intervals or pulse breakes, basically will bring about the same result.

Due to the decelerated pressure modulation on the rear axle, hence, the higher moment of inertia will be taken into account thereby precluding an excessive braking or too great an amount of slip of the rear wheels which would have an adverse effect on the driving stability of the motor vehicle or the lateral control of the rear wheels. In the absence of the measures suggested by the invention, the lateral control fo the two rear wheels could drop to excessively low values by the quasi-synchronism.

In the practice of the invention, the control of the rear wheel pressure is so adjusted that the rear wheels would tend to be braked at a lower rate or run in a range of a relatively low brake slip. The so caused relatively extended stability of the rear wheels, on the one hand, as set out earlier, results in an enhanced lateral stability and, on the other hand, permits a substantially more precise formation of the vehicle speed reference variable which has proved to be very advantageous especially in braking operations on low frictional values.

What is claimed is:

1. A slip-controlled brake system for an all-wheel driven automotive vehicle having front and rear axles and having vehicle wheels and wheel brakes and being equipped with differential locks, said system comprising, in combination:
    a plurality of electrically actuated brake pressure modulators respectively coupled to said wheel brakes for reducing braking pressure in response to slip control signals;
    a plurality of sensors respectively coupled to said wheels for providing signals indicative of wheel rotational behavior;
    means coupled to said sensors for providing an output signal indicative of said wheel rotational behavior;
    means responsive to said output signal for applying a first set of slip control signals to the modulators associated with the wheels of said front axle;
    means responsive to said output signal for applying a second set of slip control signals to the modulators associated with the wheels of said rear axle; and,
    wherein said second set of slip control signals modulates the braking pressure reduction at the rear wheel at a control rate which is less than the control rate of said first set of slip control signals means for continuously engaging said differential lock while providing said slip control signals.

2. The system according to claim 1, wherein said output signal is indicative of at least one of the medium vehicle deceleration ($b_{FZG}$) and the vehicle speed ($V_{FZG}$).

3. The system according to claim 1 wherein said slip control signals are pulses and wherein the interval between the pulses of said first set of slip control signals is less than the interval between the pulses of said second set of slip control signals.

* * * * *